US008338339B2

(12) United States Patent
Hatfield et al.

(10) Patent No.: US 8,338,339 B2
(45) Date of Patent: Dec. 25, 2012

(54) PROCESS FOR INHIBITION OF PROTEOLYTIC ACTIVITY DURING THE ENSILING OF FORAGES

(75) Inventors: Ronald D. Hatfield, Madison, WI (US);
Richard E. Muck, Madison, WI (US);
Michael L. Sullivan, Madison, WI (US);
Deborah A. Samac, Maplewood, MN (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 2729 days.

(21) Appl. No.: 10/736,155

(22) Filed: Dec. 15, 2003

(65) Prior Publication Data
US 2005/0129740 A1  Jun. 16, 2005

(51) Int. Cl.
*A01N 37/00* (2006.01)
*A01N 37/10* (2006.01)
*A01N 39/02* (2006.01)
(52) U.S. Cl. .................. 504/307; 504/321; 504/323
(58) Field of Classification Search ................. 504/116.1
See application file for complete search history.

(56) References Cited

U.S. PATENT DOCUMENTS

2003/0044448 A1* 3/2003 Myers et al. .................. 424/439
2004/0259732 A1* 12/2004 Asrar et al. .................... 504/103

FOREIGN PATENT DOCUMENTS

| GB | 2019731 | * | 11/1979 |
| JP | 02234638 | * | 9/1990 |
| SU | 578336 | * | 11/1977 |

OTHER PUBLICATIONS

Hatfield, R.,Characterization of red clover polyphenol oxidase, 2002, Plant Biology, Session 67, Enzymology p. 164.*
Hatfield, Ronald D., "Characterization of Red Clover Polyphenol Oxidase", Plant Biology 2002 Program, Heightened Frontiers in Plant Biololgy, Final Program, Plant Biology 2002, Aug. 3-7, 2002, Adams Mark Hotel, Denver, CO.

* cited by examiner

*Primary Examiner* — Alton Pryor
(74) *Attorney, Agent, or Firm* — John Fado; Randall E. Deck; Lesley Shaw

(57) ABSTRACT

A means for producing ensiled crops with reduced proteolysis by supplying an o-diphenol compound and ensuring a supply of polyphenol oxidase in the material at the time of ensilaging.

13 Claims, No Drawings

PROCESS FOR INHIBITION OF PROTEOLYTIC ACTIVITY DURING THE ENSILING OF FORAGES

BACKGROUND OF THE INVENTION

1. Field of the Invention

The present invention relates to improved treatment protocol for reducing the degree of proteolysis that occurs in ensiled crops.

2. Description of the Prior Art

Ensiling of forage crops such as alfalfa is a popular method of preserving forage for animal feed in the United States and northern Europe. Proteolysis of the protein content of the forage crop to be ensiled can be in the 40% to 90% range. (Papadopoulos, Y. A, McKersie, B. D., A Comparison of Protein Degradation During Wilting and Ensiling of Six Forage Species, Can. J. Plant Sci., 1983, 63:903-912 and Muck, R. E., Dry Matter Levels on Alfalfa Silage Quality, I. Nitrogen Transformation, Trans. ASAE 1987 30:7-14). The proteins are broken down by this process to produce ammonia, amino acids and small peptides. These materials are poorly utilized in the rumen of the animal being fed and are excreted in animal waste as urea. They thus can add to nonpoint agricultural pollution.

The preservation of forages as silage is an age-old art that has received increasing research interest to decrease animal wastes and improve animal performance through new ensiling practices and feeding management. Inhibition of endogenous plant proteases in silage is difficult. Plant tissues contain numerous proteolytic enzymes that can actively degrade forage protein as soon as the plant cell membranes are lysed or damaged. The large number and variety of proteases has hindered the development of forages that have decreased protein degradation during ensiling. The degradation of plant protein occurs rapidly in the silo with the majority (>75%) happening within the first 48 hours. Because of this, any technique to minimize proteolysis must be initiated at the time of ensiling to have maximized proteolytic inhibition.

Ensiling techniques to reduce proteolysis have focused on either the elimination of proteolytic activity or the alteration of forage proteins to a non-degradable form. Formic acid, bacterial inoculants and heat treatment have been used to enhance forage silage quality. These methods showed a reduction of proteolysis by a factor of 12-28%, with heat treatment being the most effective (Jones et al., Grass Forage Science, 1992, 47; p. 19-27; Waldo, D., The Use of Direct Acidification in Silage Production in Fermentation of Silage—A Review, M. E. McCullough, Editor. 1984, NFIA: West Des Moines, p. 119-149; Charmley et al., Inhibition of Proteolysis at Harvest Using Heat in Alfalfa Silages: Effects on Silage Composition and Digestion by Sheep, J. Anim. Sci., 1990, 68:p. 2846-2854). However none of these methods is cost effective and use of formic acid is caustic to both the machinery and the handler.

The second general approach to reducing proteolysis during ensiling is to alter the proteins so that they resist degradation. Compounds that have been tried include aldehydes (glutaraldehyde and formaldehyde) and tannins. Tannins vary in activity based on the plant producing them and the environmental conditions under which they were made. The mechanism of tannin interaction with proteins is not well understood and hence determining their application rate to a forage like alfalfa is not predictable (Albrecht, K. A and Muck, R. E., Proteolysis in Ensiled Forage Legumes That Vary in Ensilage Concentration, Crop Sci., 1991. 31:p. 464-469). The degree of protection achieved by aldehydes is relatively easy to control but they pose unacceptable health risks.

Presently, no silage treatment can consistently reduce proteolysis during ensiling, leave the forage degradable by the ruminant, pose no health risk, and yet be profitable.

There remains a need for viable and cost-effective alternatives for inhibiting proteolysis in forage crops such as alfalfa and corn during ensiling. If proteolysis could be reduced as little as 25% for alfalfa alone during ensiling, it is estimated that farmers can save 110 million dollars annually.

SUMMARY OF THE INVENTION

The present invention relates to a method for inhibiting proteolysis of silage by pretreating the forage with a plant-derived polyphenol oxidase (PPO) in conjunction with an o-diphenol compound. More specifically we have found that red clover polyphenol oxidase or other plant derived polyphenol oxidase (PPO) in conjunction with an o-diphenol compound prevents excessive pyrolysis of proteins. The inventive process includes the transformation of forages such as alfalfa to produce PPO that would simply require the addition of an o-diphenol compound such as caffeic acid, or the use of PPO transformed plants as a source of PPO to be added to other forages to be ensiled.

In accordance with this discovery, it is an object of the invention to provide a means for the ensilation of forages including, for example, corn, oats, grasses and alfalfa, that minimizes proteolysis and loss of nutritional value.

Another object is to provide a means for the minimization of nitrogen loss in the form of urea from animals that feed on ensiled crops that have had extensive protein degradation during the ensiling process.

Other objects and advantages of the invention will become readily apparent from the ensuing description.

DETAILED DESCRIPTION OF THE INVENTION

The present invention involves the creation of ensiled forages that are resistant to excessive proteolysis. This is accomplished by the treating of a plant material to be ensiled with combinations of polyphenol oxidase (PPO) and an o-diphenol compound such as catechol or caffeic acid and it derivatives (e.g. chlorogenic acid, caffeoyl tartrates, caffeoyl glucose, phasic acid, clovamide and rosmarinic acid). In most forages, PPO activity is too low for the generation of sufficient free quinones to efficiently inactivate proteolytic enzymes. However, proteolysis can be inhibited in any forage through application of PPO and an o-diphenol compound.

Forages useful for the creation of silage are, for example, alfalfa, red clover, corn, wheat, triticale, rye, barley, oat, pea, sorghum, sudan, millet and lentil. Plant parts utilized in forages are typically the total plant cut at approximately six inches above the ground. Any plant material to be ensiled can be treated to reduce proteolytic losses by providing effective levels of PPO and an o-diphenyl compound.

The o-diphenol compound is applied to forage at a rate ranging from about 5 to about 30 micromoles per gram of fresh weight forage and the oxidase is applied at a rate of about 0.1 to about 1 unit per gram of fresh weight forage. One unit is defined as one micromole of caffeic acid oxidized per minute by the following protocol.

The protocol used to determine activity is carried out at 25° C. The buffer is 20 mM TRIS-acetate pH 7.0. The caffeic acid is 100 mM in ethyl alcohol. The TNB solution is prepared by mixing for 1 hour at room temperature:

19 mg of 5,5' dithiobis-(2-nitrobenzoic acid)

13.3 ml of deionized water
30 mg of NaBH$_4$ (sodium borohydride)
Then 950 μL of buffer is combined with 20 μL of caffeic acid (final concentration 2 mM), 20 μL of TNB and 10 μL of the enzyme preparation. The decrease in absorbance at 412 nm (TNB) from 2-5 minutes is used to determine PPO activity.

The PPO can be added as a water soluble solution. The o-diphenol may be added as a water/ethanol solution to ensure good solubility. The determination of an optimal water/ethanol mix would be determinable by one of ordinary skill in the field.

This invention includes transformation of forages such as alfalfa to produce PPO, and these forages are referred to as PPO transformed crops. PPO transformed crops would simply require the addition of an o-diphenol compounds such as catechol or caffeic acid and its derivatives in order to have the constituents necessary to generate quinones which prevent proteolysis upon chopping and severe conditioning or maceration of the forage. Another alternative would be the use of PPO transformants as a source of PPO that can be extracted and added to non-PPO forages to be ensiled. Other possible strategies include planting an alternate rows of a PPO producing forage crop with a non-PPO producing forage crop so that at harvesting the two crops are combined in the same silage. The severe conditioning would result in the mixing of the two plant juices to inhibit proteolysis.

The specific biochemical mechanism of o-diphenols in polyphenol oxidase inhibition of proteolysis is unknown at this time. Initial work on red clover shows how two prominent o-diphenols, clovamide and phasic acid, are consumed during the browning reaction presumably as o-quinones which react with proteins or other phenolics. While we have not established with certainty how PPO generated quinones interact with proteases, it is bur belief that PPO generated o-quinones (such as caffeoquinone from caffeic acid) bind via their electron deficient site to nucleophilic amino acids on the proteases. The proposed reaction scheme is shown in Formula I below.

Appropriate nucleophilic sites would be amino acids such as cysteine, histidine, tryptophan and tyrosine. Such a mechanism could lead to direct inhibition of cysteine proteases as an example, provided PPO generated o-quinones could reach the site unreacted. The impact of o-quinone binding upon protein is dependent upon the number and location of sites within the protein molecule that are nucleophilic.

Red clover produces large amounts of PPO activity and o-diphenols, but the addition of red clover as a source of PPO to other ensiled forages is not viable because of the tendency of the PPO to rapidly produce o-quinones in the presence of o-diphenols and oxygen. The result is a rapid browning and eventual inactivation of the PPO itself in red clover.

To overcome this problem, we have expressed a red clover PPO gene in alfalfa. Since alfalfa does not produce the required substrates for the PPO reaction, it does not undergo the typical browning reaction and loss of PPO activity. Usable techniques for such alfalfa transformation include the methods taught by Robinson in U.S. Pat. No. 6,242,221 B1, issued Jun. 5, 2001, which teaches transgenic plants expressing PPO and is hereby incorporated by reference. The patent of Steffens (U.S. Pat. No. 6,160,204) also teaches techniques to transform plants to express PPO and is hereby incorporated by reference.

Inhibition of proteolysis in any ensiled forage is dependent upon the processing of the forage by grinding, chopping, and/or severely conditioning and exposing it at that time to o-diphenol compounds and PPO. Since PPO generated o-quinones must come in contact with proteases to shut them down, application of PPO and o-diphenol compound must occur at the time of chopping of the forage. The greater the degree of chopping/maceration of the forage the more effective the process will be for proteolytic inhibition. The reaction of PPO to produce o-quinones is oxygen dependent and therefore becomes self regulated in the silage process. The degree of chopping/maceration for effective functioning of this invention is from 30 to 60 Conditioning Index (CI), with a preferred range from about 45 to 55 Conditioning Index (CI).

Conditioning Index (CI) is herein defined as the

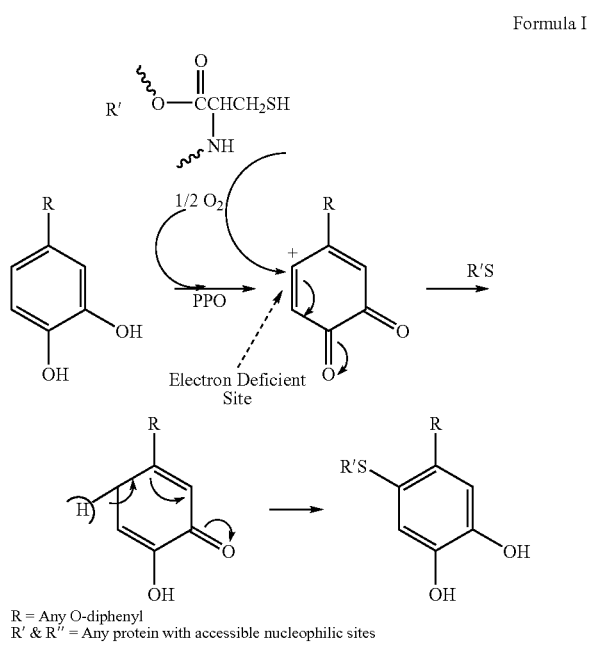

Formula I
R = Any O-diphenyl
R' & R" = Any protein with accessible nucleophilic sites $$CI = 100 \times \frac{\text{Forage conditioned leachate conductivity}}{\text{Waring Blender leachate conductivity}}$$

The procedure for determining CI is based upon the method described by Kraus, T. J., Koegel, R. G., Straub, R. J., and Shinners, K. J., Transactions of the ASAE 42(4):847-852; 1999. The CI provides a means of evaluating the degree of forage conditioning that is independent of the type of forage undergoing conditioning or the growing conditions. The following steps are used to determine Conditioning Index.

Step 1: Collect a sample of conditioned forage (500-750 g) and cut into approximately 5 cm lengths for sub-sampling. Remove 25 g and place in a covered wide mouthed homogenization jar (500 mL) along with 300 mL of deionized water. Shake on orbital shaker (200 cycles/min) for 2 minutes. Using a strainer, depress the fiber sufficiently to determine conductivity of the solution.

Step 2: Screw the blade and lip assembly of the blender on top of the jar, place on the blender and blend for 1 minute at full speed (half minute on, half minute off and then half a minute on). Use the strainer to depress the homogenized fiber and measure the conductivity of the leachate using a temperature compensated conductivity meter (Cole-Parmer 1481-60). This method of measuring the conditioning index is described in full detail in a MS thesis of Joshua D. Bacon, September 2003, University of Wisconsin, BSE department.

Step 3: Calculate the conditioning index (CI) by dividing the conductivity of the leachate from the mechanical conditioning (CLMCd) by the conductivity of the leachate from the Waring Blender (CLWB).

$$CI=(CLMCd/CLWB)\times 100$$

It is understood that the foregoing detailed description is given merely by way of illustration and that modifications and variations may be made therein without departing from the spirit and scope of the invention. For example, choice of specific components, their relative proportion and degree of reaction may be readily determined by those skilled in the art without undue experimentation using the teachings herein.

The term o-diphenol is herein defined as those o-diphenols that can effectively react with polyphenol oxidases and may include catechol and caffeic acid and related compounds. These compounds are herein defined as containing two hydroxyl groups in an ortho position on a phenyl ring. Substitutions could be as in caffeic acid, an o-diphenol with a three carbon chain or its derivatives, chlorogenic acid, clovamide or caffeoyl malates. Although any o-diphenol should work, we have found that caffeic acid or its derivatives and catechol and related compounds are the best substrates for this PPO reaction. An effective amount of o-diphenol is defined herein as the amount needed to achieve at least 20% proteolytic inhibition.

The term "effective amount" is used herein to refer to the quantity of o-diphenol compound and polyphenol oxidase necessary to achieve a reduction in proteolysis of ensiled material as compared to an untreated control under suitable conditions of treatment as defined herein.

EXAMPLE 1

Proteolytic Inhibition in Red Clover Requires O-Diphenols

Clarified extracts of red clover leaves were made in 50 mM MES, pH 6.5 (crude extract in Table 1). Where indicated, extracts were desalted using a Sephadex G-25 spin column equilibrated with 50 mM MES, pH 6.5, to remove low molecular weight molecules (i.e. o-diphenols). Extract protein concentrations were adjusted to 2 mg/ml with buffer. Where indicated, the o-diphenol in the form of caffeic acid (CA) was added to a final concentration of 3 mM. Extracts were incubated at 37° C. At the indicated times, samples were removed, trichloroacetic acid (TCA) added to 5%, and release of free amino acids (a measure of proteolytic activity) into the TCA-soluble supernatant was determined by ninhydrin assay. Data are the average of three experiments using independent tissue samples ±standard error. The results are presented below in Table 1.

TABLE 1

| Time (Hours) | Crude | Desalted | Desalted + CA |
|---|---|---|---|
| 0 | 0.00 ± 0.00 | 0.00 ± 0.00 | 0.00 ± 0.00 |
| 1 | 0.06 ± 0.02 | 0.20 ± 0.03 | 0.04 ± 0.01 |
| 2 | 0.09 ± 0.02 | 0.41 ± 0.03 | 0.06 ± 0.01 |
| 3 | 0.11 ± 0.02 | 0.59 ± 0.06 | 0.09 ± 0.01 |
| 4 | 0.15 ± 0.03 | 0.73 ± 0.07 | 0.11 ± 0.02 |

Results

Little proteolysis is seen in red clover extracts (RC). Removal of low molecular weight factors by gel filtration, however, results in extensive proteolysis during the four hour time period analyzed (desalted RC). Assuming an average protein molecular weight of 50,000, approximately 8% of the amino acids initially present in protein are released into the TCA supernatant by proteolysis during the four-hour incubation. This may be an underestimation of the actual extent of proteolysis taking place, since the assay only measures release of free amino acids and very short peptides. Proteolytic events that result in larger peptides (i.e. endoproteolytic cleavages) would not be detected. Addition of 3 mM caffeic acid to the extract reduced proteolysis to an extent comparable to the non-desalted red clover extract, which showed an 80-85% reduction compared to no caffeic acid addition. Together, these results suggest involvement of a low molecular weight molecule in red clover proteolytic inhibition, and that this molecule is likely an o-diphenol.

EXAMPLE 2

PPO and O-Dipenols are Necessary and Sufficient for Proteolytic Inhibition in Alfalfa Extracts Since alfalfa appears to lack both significant endogenous PPO activity and o-diphenols in its leaves, we were able to test directly the role of PPO and o-diphenols in proteolytic inhibition in plant extracts utilizing transgenic alfalfa expressing the red clover PPO1 gene (PPO-alfalfa) and control alfalfa not expressing a PPO transgene (control-alfalfa). Proteolysis was measured in leaf extracts essentially as described in Experiment 1 above. The o-diphenol in the form of caffeic acid was added to 3 mM caffeic acid. Data are the average of three experiments using independent tissue samples ±standard error. The results are presented below in Table 2.

TABLE 2

| | Amino Acid Release (mmol/mg) | | | |
|---|---|---|---|---|
| Time (h) | Control-Alf − C | Control-Alf + C | PPO-Alf − CA | PPO-Alf + CA |
| 0 | 0.00 ± 0.00 | 0.00 ± 0.00 | 0.00 ± 0.00 | 0.00 ± 0.00 |
| 1 | 0.18 ± 0.02 | 0.21 ± 0.00 | 0.22 ± 0.03 | 0.06 ± 0.01 |
| 2 | 0.36 ± 0.03 | 0.39 ± 0.02 | 0.40 ± 0.03 | 0.11 ± 0.01 |
| 3 | 0.51 ± 0.03 | 0.56 ± 0.01 | 0.54 ± 0.06 | 0.10 ± 0.02 |
| 4 | 0.66 ± 0.04 | 0.70 ± 0.02 | 0.68 ± 0.07 | 0.15 ± 0.02 |

Results

Considerable proteolysis is seen in alfalfa leaf extracts. In these experiments, 7-8% of the amino acids initially present in protein are released into the TCA supernatant by proteolysis during the four hour incubation for the control-alfalfa extract. Addition of caffeic acid had no significant effect on proteolysis in the control alfalfa extracts. In the absence of added caffeic acid, extracts of PPO-alfalfa showed an extent of proteolysis similar to that seen for the control alfalfa. Addition of caffeic acid to PPO-alfalfa extract resulted in an almost 80% reduction in proteolysis, an effect similar in magnitude to that seen for red clover.

EXAMPLE 3

O-Diphenol Concentration Dependence of Proteolytic Inhibition

Proteolysis after a four hour incubation at 37° C. was measured essentially as described for Experiment 1 above in leaf extracts of either transgenic alfalfa expressing the red clover PPO1 gene (PPO-alfalfa) or control-alfalfa not expressing an exogenous PPO gene (control-alfalfa) using the o-diphenol in the form of caffeic acid at various concentrations up to 10 mM. Data are the average of three experiments using independent tissue samples ±standard error. The results are presented below in Table 3.

TABLE 3

|  | Caffeic Acid, mM | Mean four hour Amino Acid Release (μmol/mg) |
|---|---|---|
| Control-Alfalfa | 0 | 0.70 ± 0.04 |
|  | 0.5 | 0.75 ± 0.09 |
|  | 1 | 0.69 ± 0.06 |
|  | 2 | 0.70 ± 0.07 |
|  | 3 | 0.66 ± 0.09 |
|  | 4 | 0.75 ± 0.07 |
|  | 5 | 0.75 ± 0.11 |
|  | 10 | 0.65 ± 0.06 |
| PPO-Alfalfa | 0 | 0.74 ± 0.06 |
|  | 0.5 | 0.32 ± 0.03 |
|  | 1 | 0.25 ± 0.03 |
|  | 2 | 0.16 ± 0.03 |
|  | 3 | 0.11 ± 0.02 |
|  | 4 | 0.08 ± 0.02 |
|  | 5 | 0.06 ± 0.01 |
|  | 10 | 0.04 ± 0.02 |

Results

Even at the lowest caffeic acid concentration tested (0.5 mM), significant proteolytic inhibition (>50% compared to extracts to which no caffeic acid was added) was seen. At a level of 3 mM caffeic acid, >80% proteolytic inhibition is observed. Caffeic acid appeared to have little effect on proteolysis in the absence of PPO activity.

EXAMPLE 4

PPO Concentration Dependence of Proteolytic Inhibition

PPO activity present in reaction mixtures was varied from 0 to 500 mU/ml of extract by mixing extracts from PPO- and control-alfalfa (1 U=1 micromole caffeic acid oxidized/min; red clover and PPO-Alfalfa have 0.5-5 U activity/mg protein) to achieve a final protein concentration of 2 mg/ml. Proteolysis in the reaction mixtures following a four hour incubation at 37° C. was measured essentially as described above for reaction mixture with and without caffeic acid added to 3 mM (+CA and −CA, respectively). Data are the average of three experiments using independent tissue samples ±standard error. The results are presented below in Table 4.

TABLE 4

|  | [PPO] mU/ml | Mean four hour Amino Acid Release (μmol/mg) |
|---|---|---|
| No Caffeic Acid | 500 | 0.68 ± 0.09 |
|  | 250 | 0.74 ± 0.09 |
|  | 125 | 0.74 ± 0.11 |
|  | 62.5 | 0.68 ± 0.06 |
|  | 32 | 0.77 ± 0.11 |
|  | 16 | 0.78 ± 0.14 |
|  | 0 | 0.72 ± 0.10 |
| 3 mM Caffeic Acid | 500 | 0.06 ± 0.03 |
|  | 250 | 0.12 ± 0.01 |
|  | 125 | 0.15 ± 0.03 |

TABLE 4-continued

| [PPO] mU/ml | Mean four hour Amino Acid Release (μmol/mg) |
|---|---|
| 62.5 | 0.21 ± 0.02 |
| 32 | 0.34 ± 0.05 |
| 16 | 0.36 ± 0.03 |
| 0 | 0.79 ± 0.10 |

Results

When caffeic acid is present, significant proteolytic inhibition is seen even with relatively small amounts of PPO activity present in alfalfa extracts. Significant inhibition (>50%) was observed even with the smallest amount of PPO activity tested (16 mU/ml). Addition of >125 mU/ml PPO activity resulted in >80% inhibition of proteolysis. We believe most of this apparent difference is likely due to proteolysis early in the course of the reaction. Proteolytic inhibition following more extended incubations (i.e. 24-48 hours) may show far less dependence on the amount of PPO activity present.

EXAMPLE 5

Effect of Different O-Diphenols on Proteolytic Inhibition

Proteolysis after a four hour incubation at 37° C. was measured (as described in Example 1 above) of alfalfa for reaction mixtures containing either 250 mU/ml PPO activity (protein adjusted to 2 mg/ml with control alfalfa extract) or a control alfalfa extract (2 mg/ml protein). Various o-diphenols were present in the reaction mixtures at 3 mM, including caffeic acid (CA) hydrocaffeic acid (HCA), chlorogenic acid (CGA), catechol, and (−)-epicatichin. The results are presented below in Table 5.

TABLE 5

| Extract Source | Substrate | Mean four hour Amino Acid Release (μmol/mg) |
|---|---|---|
| Control-Alfalfa | none | 0.71 ± 0.05 |
|  | CA | 0.75 ± 0.08 |
|  | HCA | 0.70 ± 0.07 |
|  | CGA | 0.80 ± 0.06 |
|  | Catechol | 0.71 ± 0.10 |
|  | Epicatichin | 0.64 ± 0.08 |
| PPO-Alfalfa | none | 0.72 ± 0.12 |
|  | CA | 0.12 ± 0.03 |
|  | HCA | 0.25 ± 0.07 |
|  | CGA | 0.26 ± 0.06 |
|  | Catechol | 0.37 ± 0.05 |
|  | Epicatichin | 0.25 ± 0.08 |

Results

All o-diphenols tested showed significant proteolytic inhibition in the plant extracts (~50% or greater) when PPO was present. Although catechol is a relatively poor substrate for the red clover PPO1 gene product expressed in the transgenic alfalfa, use of this o-diphenol still showed significant proteolytic inhibition. It is Applicants' belief that as a direct substrate for the red clover PPO (transgenic alfalfa) the rate at which catechol forms o-quinones is not as fast as with caffeic acid and it still can be effective in inhibiting proteolysis. It appears that two aspects are important in this process of proteolytic inhibition:

1) the o-diphenol must be an appropriate substrate for the PPO, i.e., it can be oxidized by the enzyme; and 2) the rate of initial oxidation by PPO is not so critical, the o-quinone can still react with appropriate amino acids (nucleophiles) or proteases during the initial steps of ensiling (first 24 hours).

EXAMPLE 6

PPO-Derived from Transgenic Alfalfa Inhibits Proteolysis in an Oat Extract

Proteolysis was measured in oat leaf extracts or oat leaf extracts with PPO activity added (125 mU/ml). The added PPO activity was from an extract of red clover PPO1-expressing alfalfa. As a control, another set of oat extracts had control-alfalfa (non-PPO expressing) extract added. Total protein was 1.75 mg/ml. In Oat+alfalfa extracts, oat protein was present at 1.4 mg/ml and alfalfa protein was present at 0.35 mg/ml. Caffeic acid was present at 3 mM. Results in Table 6 below are for the average of two experiments using independent tissue samples.

TABLE 6

| | Mean amino acid release, µmol/mg protein | | |
|---|---|---|---|
| Time | Oat | Oat/Control-Alf | Oat/PPO-Alf |
| | No added Caffeic Acid | | |
| 0 | 0.00 ± 0.00 | 0.00 ± 0.00 | 0.00 ± 0.00 |
| 1 | 1.14 ± 0.21 | 1.24 ± 0.20 | 0.87 ± 0.14 |
| 2 | 1.88 ± 0.00 | 1.77 ± 0.04 | 1.56 ± 0.21 |
| 3 | 2.26 ± 0.11 | 2.03 ± 0.13 | 1.86 ± 0.21 |
| 4 | 2.60 ± 0.35 | 2.13 ± 0.25 | 2.02 ± 0.02 |
| | With 3 mM Caffeic Acid | | |
| 0 | 0.00 ± 0.00 | 0.00 ± 0.00 | 0.00 ± 0.00 |
| 1 | 0.82 ± 0.18 | 0.75 ± 0.17 | 0.60 ± 0.20 |
| 2 | 1.39 ± 0.09 | 1.42 ± 0.06 | 0.80 ± 0.13 |
| 3 | 1.73 ± 0.15 | 1.73 ± 0.05 | 0.82 ± 0.11 |
| 4 | 1.79 ± 0.07 | 1.91 ± 0.05 | 1.02 ± 0.22 |

Results

Simple addition of caffeic acid to oat extracts appears to result in some inhibition of proteolytic activity, perhaps due to the presence of endogenous PPO activity in oats, since all reactions containing CA showed lower proteolysis (10-30%) than their counterparts lacking caffeic acid. When exogenous PPO was added, however, significantly higher proteolytic inhibition was observed (~50%). These observations suggest that exogenously added PPO and o-diphenol substrates can inhibit proteolysis in plant extracts other than clover and alfalfa.

EXAMPLE 7

Proteolysis is Reduced in Ensiled PPO-Alfalfa

Greenhouse grown PPO- and control-alfalfa was harvested, dried to approximately 30% dry matter, and treated with the o-diphenol catechol (1.5 mg/g tissue, 14 µmol/g tissue). Tissue was macerated using a meat grinder. Duplicate samples were removed and frozen in liquid nitrogen for analyses of initial free amino acid content. The remaining tissue was treated with a lactobacillus silage inoculant, ensiled in triplicate 30 g minisilos, and incubated for 14 days at 30° C. Following incubation, water extracts were made of the initial and final samples. The water extracts were made 5% in TCA, and free amino acids present in the TCA supernatant were analyzed by the ninhydrin assay.

Results

For silage made from PPO-alfalfa, the relative amino acid release was only 82% that of control-alfalfa (standard error based on the replicates within the experiment are 2% and 5% for control and PPO-alfalfa, respectively), indicating reduced proteolysis during ensiling of the PPO-alfalfa.

The results of the examples suggest there may be a low level of PPO and o-diphenol activity already within the forage but both it and the level of natural phenols is too low to result in adequate proteolytic inhibition. Through the addition of both PPO and o-diphenol compounds, it is possible to control the level of o-quinones produced in order to optimize proteolytic inhibition without excessive reaction that has the potential for decreasing the nutritional value of the native proteins. PPO can be added as a water soluble solution. The o-diphenols are optimally added as a water/ethanol solution to ensure good solubility.

It is understood that the foregoing detailed description is given merely by way of illustration and that modifications and variations may be made therein without departing from the spirit and scope of the invention. For example, choice of specific components, their relative proportion and degree of reaction may be readily determined by those skilled in the art without undue experimentation using the teachings hereof.

We claim:

1. A method for the reduction of proteolysis in ensiled crops comprising contacting a crop material to be ensilaged with an o-diphenol compound and polyphenol oxidase at the time of ensilaging in an amount effective to reduce the degree of proteolysis of the crop material, wherein said crop material is selected from the group consisting of alfalfa, corn, wheat, triticale, rye, barley, oat, pea, sorghum, sudan, millet, and lentil.

2. The method of claim 1 wherein the amount of said o-diphenol and said polyphenol oxidase is sufficient to reduce the degree of proteolysis by at least 20%.

3. The method of claim 1 wherein the o-diphenol compound is applied to the crop material to be ensilaged at a rate ranging from about 5 to about 30 micromoles per gram fresh weight and the polyphenol oxidase is applied to the crop material to be ensilaged at a rate ranging from about 0.1 to about 1.0 unit per gram fresh weight.

4. The method of claim 1 wherein the crop material to be ensilaged is macerated to a conditioning index ranging from 30 to 60.

5. The method of claim 1 wherein the o-diphenol compound is selected from the group consisting of caffeic acid, catechol, chlorogenic acid, phasic acid, rosmarinic acid, caffeoyl tartrate, and caffeoyl glucose.

6. The method of claim 1 wherein said crop material is selected from the group consisting of alfalfa and oat.

7. A method for the reduction of proteolysis in ensiled crops comprising contacting a polyphenol oxidase transformed crop to be ensilaged with an o-diphenol compound at the time of ensilaging in an amount effective to reduce the degree of proteolysis in the crop, wherein said crop is selected from the group consisting of alfalfa, corn, wheat, triticale, rye, barley, oat, pea, sorghum, sudan, millet, and lentil.

8. The method of claim 7 wherein the quantity of said o-diphenol compound is sufficient to reduce the degree of proteolysis by at least 20%.

9. The method of claim 7 wherein the crop to be ensilaged is macerated to a conditioning index ranging from about 30 to about 60.

10. The method of claim 7 wherein the o-diphenol compound is selected from the group consisting of caffeic acid, catechol, chlorogenic acid, phasic acid, rosmarinic acid, caffeoyl tartrate, and caffeoyl glucose.

11. The method of claim 7 wherein said crop is selected from the group consisting of alfalfa and oat.

12. A method for the reduction of proteolysis in ensiled crops consisting essentially of contacting a crop material to be ensilaged with an o-diphenol compound and polyphenol oxidase at the time of ensilaging in an amount effective to reduce the degree of proteolysis of the crop material, wherein said crop material is selected from the group consisting of alfalfa, corn, wheat, triticale, rye, barley, oat, pea, sorghum, sudan, millet, and lentil.

13. The method of claim 12 wherein said crop material is selected from the group consisting of alfalfa and oat.

* * * * *